(12) United States Patent  
Nejedlo (10) Patent No.: US 7,155,370 B2
(45) Date of Patent: Dec. 26, 2006

(54) REUSABLE, BUILT-IN SELF-TEST METHODOLOGY FOR COMPUTER SYSTEMS

(75) Inventor: Jay Nejedlo, Wilsonville, OR (US)

(73) Assignee: Intel Corporation, Santa Clara, CA (US)

(*) Notice: Subject to any disclaimer, the term of this patent is extended or adjusted under 35 U.S.C. 154(b) by 67 days.

(21) Appl. No.: 10/393,223

(22) Filed: Mar. 20, 2003

(65) Prior Publication Data

US 2004/0186688 A1 Sep. 23, 2004

(51) Int. Cl.
*G06F 15/00* (2006.01)
*G01R 31/00* (2006.01)

(52) U.S. Cl. ............... 702/186; 702/118; 324/763; 714/43; 714/44

(58) Field of Classification Search ........... 702/108, 702/117, 118–124, 182, 183, 185, 186; 329/763, 329/500; 714/27, 40, 42–44
See application file for complete search history.

(56) References Cited

U.S. PATENT DOCUMENTS

| | | | | |
|---|---|---|---|---|
| 5,047,926 A | * | 9/1991 | Kuo et al. ............ 714/29 |
| 5,377,199 A | | 12/1994 | Fandrich | |
| 5,436,856 A | * | 7/1995 | Sauvage ............ 702/120 |
| 5,596,715 A | * | 1/1997 | Klein et al. ............ 714/43 |
| 5,704,035 A | | 12/1997 | Shipman | |
| 5,726,991 A | | 3/1998 | Chen et al. | |
| 5,757,171 A | | 5/1998 | Babcock | |
| 5,845,136 A | | 12/1998 | Babcock | |
| 5,875,293 A | * | 2/1999 | Bell et al. ............ 714/27 |
| 5,954,523 A | | 9/1999 | Babcock | |
| 6,047,373 A | | 4/2000 | Hall et al. | |
| 6,073,253 A | * | 6/2000 | Nordstrom et al. ....... 714/25 |
| 6,089,879 A | | 7/2000 | Babcock | |
| 6,101,457 A | * | 8/2000 | Barch et al. ............ 702/117 |
| 6,101,578 A | | 8/2000 | Patwardhan et al. | |
| 6,122,733 A | | 9/2000 | Christeson et al. | |
| 6,256,731 B1 | | 7/2001 | Hall et al. | |
| 6,271,704 B1 | | 8/2001 | Babcock et al. | |
| 6,357,027 B1 | | 3/2002 | Frankowsky | |
| 6,385,236 B1 | | 5/2002 | Chen | |
| 6,502,212 B1 | * | 12/2002 | Coyle et al. ............ 714/43 |
| 6,505,317 B1 | * | 1/2003 | Smith et al. ............ 714/738 |
| 6,530,052 B1 | * | 3/2003 | Khou et al. ............ 714/733 |

(Continued)

FOREIGN PATENT DOCUMENTS

WO  WO 9939218 A2 * 8/1999

OTHER PUBLICATIONS

U.S. Appl. No. 10/224,492, filed Aug. 21, 2002, Tripp et al.

(Continued)

*Primary Examiner*—Marc S. Hoff
*Assistant Examiner*—Manuel L. Barbee
(74) *Attorney, Agent, or Firm*—Blakely, Sokoloff, Taylor & Zafman LLP (57) ABSTRACT

A methodology for testing a computer system using multiple test units, each test unit being associated with its respective core function circuitry. The core circuitry and its respective test unit are located in a primary integrated circuit component of the computer system, such as a processor, memory, or chipset. The on-chip test units communicate with one another and with other parts of the system, to determine whether a specification of the computer system is satisfied, without requiring a processor core of the computer system to execute an operating system program for the computer system.

14 Claims, 5 Drawing Sheets

U.S. PATENT DOCUMENTS

| | | | |
|---|---|---|---|
| 6,564,348 B1 * | 5/2003 | Barenys et al. ............. | 714/732 |
| 6,609,221 B1 | 8/2003 | Coyle et al. | |
| 2002/0073374 A1 | 6/2002 | Danialy et al. | |
| 2002/0194545 A1 | 12/2002 | Abbott | |
| 2004/0102916 A1 * | 5/2004 | Chen et al. ................ | 702/117 |

OTHER PUBLICATIONS

U.S. Appl. No. 10/319,517, filed Dec. 16, 2002, Babcock et al.

Doran, Mark, *Extensible Firmware Interface EFI 1.10 and Beyond: An Overview*, Intel Developer Forum, Sep. 9-12, 2002, pp. 1-26.

Hong, Yeoh Eng et al., *An Overview of Advanced Failure Analysis Techniques for Pentium$^R$ and Pentium$^R$ Pro Microprocessors*, Intel Technology Journal Q2, '98, pp. 1-11.

Sun Microelectronics MicroSPARC-IIep, *Introduction to JTAG Boundary Scan*, Sun Microsystems, Inc. White Paper, Jan. 1997, pp. 1-8.

* cited by examiner

REUSABLE, BUILT-IN SELF-TEST METHODOLOGY FOR COMPUTER SYSTEMS

RELATED APPLICATIONS

U.S. patent application Ser. No. 10/319,517, Testing Methodology and Apparatus for Interconnects, filed Dec. 16, 2002 (pending).

BACKGROUND

The invention is related to methodologies for testing computer systems and their integrated circuit (IC) components, during and after manufacture, to determine whether their electrical specifications have been met as well as that they have been assembled correctly.

Industry trends for high performance computer systems, such as those that use a Pentium processor and an associated chipset by Intel Corp., Santa Clara, Calif., are towards faster product cycle times (time to market) with sustained high quality. At the same time, component to component bus speeds are increasing beyond several GHz, and printed wiring board densities are increasing, to meet the need for greater performance. These demands are rendering conventional testing techniques such as oscilloscope and logic analyzer probing less reliable, or even impossible, on high speed interfaces, both in the high volume manufacturing setting as well as earlier in the electrical validation and verification setting.

At the board and platform level, the system has its primary components, including the processor, system chipset, and memory, installed on a motherboard. In that stage of manufacturing, transaction-based tests have been used, in a board or platform high volume manufacturing setting, to verify a wide range of storage and logic functions of the system. Such tests evaluate whether the memory subsystem and the I/O subsystem work according to their electrical specifications. The test is performed by the processor executing a special test routine, during or after booting an operating system (OS) program, that causes test patterns that are part of the test routine to be written to and then read from addresses that span the computer system. However, faults of a high frequency type (such as due to cross talk between adjacent signal lines and inter-symbol interference (ISI) due to transmission line effects) cannot be detected or isolated using such techniques, due to the coarse test granularity and high instruction overhead associated with running an OS-based test program.

Another type of computer system test calls for the processor to execute firmware/software that operates at a lower level than an OS-based program, prior to booting the operating system. These include basic I/O system (BIOS) and extended firmware interface (EFI) programs. Although these types of tests provide relatively low-level, and hence more accurate, control of component functionality and interconnect buses, system interactions cannot be stressed to their bandwidth specifications in such tests. In addition, the ability of BIOS/EFI tests to isolate a fault with sufficient granularity is also limited.

Finally, there is a low level technique known as boundary scan testing (or the Joint Test Access Group, JTAG, protocol) which calls for on-chip circuitry used to control individual bits transmitted between components. Once again, however, there is no provision for testing high frequency faults. For example, a boundary scan test may detect "opens" and "shorts" while running at a 10 MHz clock, whereas normal signaling speed on the interconnect will be in the GHz range.

BRIEF DESCRIPTION OF THE DRAWINGS

The invention is illustrated by way of example and not by way of limitation in the figures of the accompanying drawings in which like references indicate similar elements. It should be noted that references to "an" embodiment of the invention in this disclosure are not necessarily to the same embodiment, and they mean at least one.

DETAILED DESCRIPTION

Figure 1:
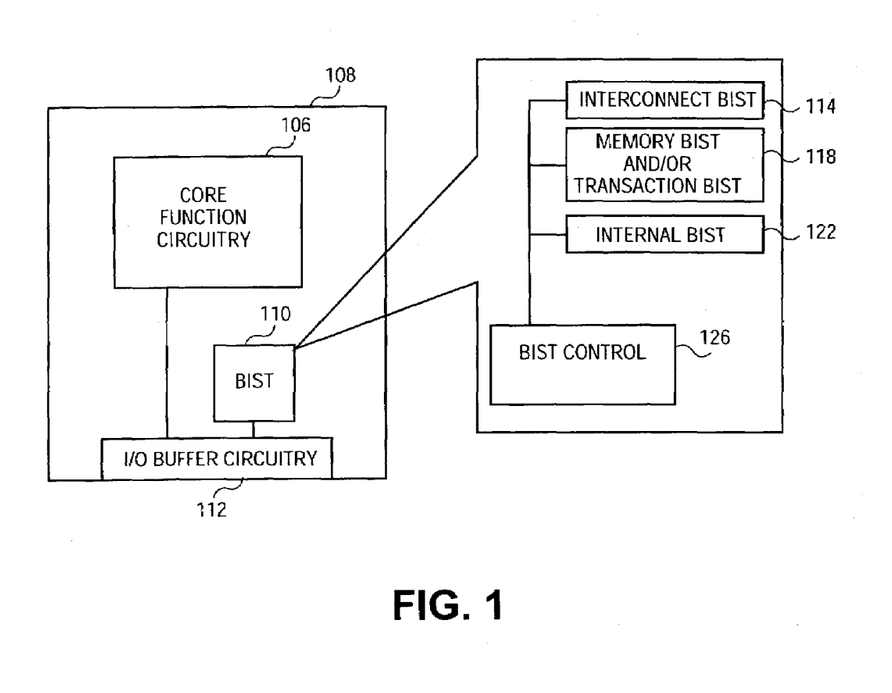
FIG. 1 illustrates a block diagram of a primary component of a computer system having a built-in-self-test (BIST) unit.

Referring to FIG. 1, the embodiments of the invention described below provide a primary IC component 108 of a computer system with a stand alone, built in self test (BIST) unit 110 that is separate from its core function circuitry 106. Both the core function circuitry 106 and the BIST unit 110 are coupled to control an interconnect bus (not shown in FIG. 1) that is driven and sensed by I/O buffer circuitry 112. The primary IC component 108 may be a processor, memory subsystem, or a system chipset. The BIST unit 110 may be integrated into a processor or chipset IC package, such as part of a multi-chip module; the BIST unit may also be on-chip with a processor die, a chipset die, or any part of memory subsystem hardware.

During normal operation, the I/O buffer circuitry 112 responds to and receives signals from the core function circuitry 106, which may be that of a processor or a system chipset. However, upon system power-up and during special test modes, the BIST unit 110 may be requested to take full control of an interconnect bus (through the I/O buffer circuitry 112). The BIST unit 110 uses the same on-chip logic to transmission line signal interface as the core function circuitry 106, namely the I/O buffer circuitry 112. It thus experiences the same signal paths and timing delays as the core when controlling the interconnect bus, and can therefore reliably test, at speed, not only the interconnect bus to which its component is connected, but also the functionality of other parts of the computer system, without requiring the processor to execute an OS program, thereby saving much time during testing. This helps increase test coverage and improve diagnostic granularity, relative to the conventional techniques for testing a system or platform, while at the same time allowing transparent control and execution via BIOS or firmware (FW) routines that are integrated into the system.

The computer system may be equipped with multiple BIST units, one in each primary component. These BIST units may be designed to communicate with one another or with initialized components of the system, to determine whether a specification of the system or platform is satisfied, without requiring a processor core of the system to execute an OS program for the system. A combination of three different capabilities allows essentially a full system or platform test to be conducted, using BIST-enhanced components. These capabilities are referred to here as interconnect, memory, and transaction BIST (IBIST, MBIST, and TBIST).

The IBIST capability of a computer system is responsible for at speed interconnect testing, particularly effective for testing connections to parallel buses, such as the processor bus, and high speed serial interfaces on a carrier substrate (e.g. the motherboard or a daughter card). See U.S. patent application Ser. No. 10/319,517 filed Dec. 16, 2002 Testing Methodology and Apparatus for Interconnects, (pending) assigned to the same assignee as that of this application. The IBIST capability may also be used, during manufacture, to validate whether a component meets an interconnect specification. For example, IBIST may be designed to determine whether there are any defects in the connections between a die and its package terminals, whether there are any defects in the connections between two packaged IC dies of a module, and whether an IC package has been installed properly on a carrier substrate. The IBIST capability may use silicon-synchronized test stimulus and capture, i.e. synchronized with the clocks that are normally used by the associated core function circuitry. IBIST may also be provided with the ability to test asynchronous interfaces. The IBIST capability may be designed to detect essentially all of the digital and analog pin level, structural faults, essentially all of the digital and analog performance faults, as well as automatic diagnosis to the pin level. Stress test algorithms may be included as well, to stress the I/O buffers' drivers and receivers (including analog circuitry in the I/O pad cells of an IC component) in terms of voltage levels, timing, and transmission line loading.

As suggested above, the IBIST circuitry or "cell" should be designed to use the same component interconnect and timing paths that the core function circuitry would use during normal operation. Output and input latches may lie inside the IBIST loop (formed by an IBIST cell at one end of an interconnect and another IBIST cell at the other end.)

Precise control of test patterns is possible because the IBIST operation is independent of OS and I/O subsystem communication protocols such as the Peripheral Component Interconnect (PCI) Express packet and link protocol described in PCI Express Specification 1.0 and PCI Express Card Electro Mechanical Specification which are available from the PCI Special Interest Group, Portland, Oreg. In that case, IBIST operates in the physical layer of the PCI Express architecture, isolated from the higher, link and transaction layers. Improvements in test times relative to higher level, software based testing is expected to be significant. Improvements in coverage levels and diagnostic granularity are also expected. An example of an IBIST architecture and IBIST methodology is given in FIGS. 4 and 5 to be described below.

Another part of the computer system is its memory BIST (MBIST) capability. MBIST is intended primarily to test the core function circuitry of the memory subsystem hardware, i.e. the memory core and interfaces, which may have static random access memory (static RAM), dynamic RAM, and/or synchronous dynamic RAM. This aspect may include the Programmable Memory BIST by LogicVision, Inc., San Jose, Calif. Memory test algorithms that may be implemented in the MBIST cell include basic interconnect (testing the connections between a memory controller or transceiver and a number of memory IC packages), and a memory location test such as 4-6-10N March.

In some embodiments, the MBIST cell can initialize the error detection and/or correction circuitry (ECC) of the memory IC packages, including for example properly setting syndrome bits (a task normally done by a conventional BIOS program executing). The MBIST cell should also be capable of testing a piece of address space, rather than the entire memory address space, as well as be configurable with alternative memory test algorithms. Such capability is particularly useful when a memory module is "hot plugged", to test just the new module. The MBIST cell should be designed to detect the complete fault spectrum of the memory subsystem (including the use of stress test algorithms), as well as provide automatic diagnosis to the pin level. In this way, MBIST may essentially eliminate power on self test (POST) memory testing and functional board fixture costs, as well as significantly reduce test times as compared to OS/software based tests. This also reduces system boot time since conventional memory tests are a part of POST. Finally, multiple failure detection may be obtained in a single pass (e.g. all memory modules can be tested simultaneously) and test development times become nearly zero since conventional firmware or OS tests do not have to be written.

The third aspect of built-in self-test for a computer system is the transaction BIST (TBIST) capability. This capability may, in essence, emulate the core function circuitry's use of a typical bus transaction on a primary interconnect bus, without the aid of an OS. For example, if implemented in a Pentium IV processor by Intel Corp., a TBIST cell would emulate the processor core's handling of Front Side Bus (FSB) transactions, at speed. The TBIST capability in a computer system may be designed to read and write the complete address space of the system, and will experience the same timing associated with critical paths through multiple components (particularly when testing outlying devices of the system) that the core function circuitry will face. TBIST cells may also reside in other components of the system or platform, including for example the chipset and I/O card components. A TBIST cell may be configured as a master or slave of a bus transaction.

Although in principle the TBIST capability should be isolated from that of the system component's core functions, running TBIST may in some cases require the processor and chipset to be first initialized so that bus transactions can be initiated and completed. TBIST may even be designed to emulate an OS boot (e.g. to determine why the system or platform does not boot, at a per transaction level) or a multi-threaded environment which is conventionally controlled by the OS, for user controlled debugging of the system board, including the functions of the memory and I/O subsystems This capability of TBIST is expected to stress the hardware of the system or platform. For example, different TBIST cells in the system can be running different transactions simultaneously, at speed, which may be similar to how multiple, real applications are executed simultaneously in the system or platform. TBIST may also be used, on a per transaction basis rather than pin level, to verify the operation of glue logic on the system board or platform. Glue logic which allows primary components and I/O cards to communicate with each other and might not be adequately tested by either IBIST or MBIST.

Based on the description above, it can be seen that each BIST unit 110, as shown in FIG. 1, will have IBIST capability 114 and either MBIST or TBIST capability 118 (or both). Every primary component of the system may be equipped with IBIST capability, at least on all performance interfaces, so as to test an interconnect bus at that component. The MBIST cell, however, may only be needed in the memory subsystem components. In some cases, the MBIST cell may be in the processor package, rather than in an intermediate buffer component between the processor and memory IC packages. In addition to IBIST 114 and MBIST and/or TBIST 118, the IC component 108 may also include an internal BIST 122, to test the internal or core function circuitry 106. The BIST unit of each component may be implemented using hardwired logic, such as a state machine, and may be a relatively small part of the entire circuitry of a primary component. Finally, BIST control logic 126 is provided to allow configuration, execution control, diagnostic ability and status retrieval of the MBIST, TBIST and IBIST cells, to be accessed from outside of the component. Examples of these interfaces will be described in the "Interface to BIST" section below.

Figure 2:
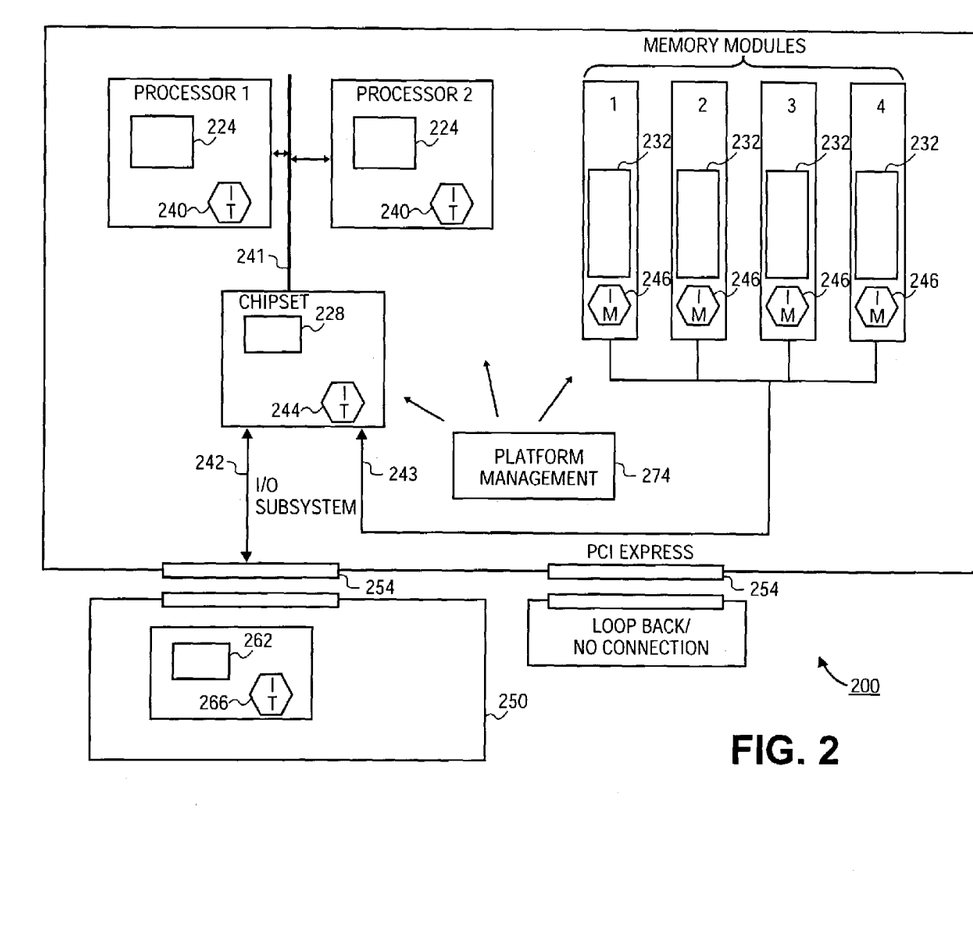
FIG. 2 shows a block diagram of a computer system with multiple components and corresponding BIST units.

Turning now to FIG. 2, what is shown is a diagram of a computer system 200 equipped with multiple BIST units 240, 244, 246, and 266 which are associated with their respective core function circuitry, namely processor core 224, chipset core 228, and memory cores 232. Note that by isolating the core function circuitry 224, 228, 232, and 262, from test patterns that are applied by on-chip BIST units, not only can the internal parts of an IC component be evaluated, but the system external to the component can also be checked without requiring an OS boot.

The externals may include component interconnect buses 241, 242, and 243, board connectors 254, and other on-board, primary components of the system such as graphics components (not shown). Additional externals include I/O devices or peripherals such as I/O card 250 and other add-on cards (not shown) that are part of the assembled computer system platform. In that case, there is a BIST unit 266 which is associated with I/O function circuitry 262. That unit may be equipped with an IBIST cell as well as a TBIST cell, which are designed to communicate with other IBIST and TBIST cells of the system and, in the case of TBIST, act as master or slave of a bus transaction, to push the testing envelope to include not only the interconnect bus 242 but also connectors 254 (e.g. using IBIST cell in unit 244 to detect whether a board adaptor is present on the connectors 254) and the die to board connections of I/O components on the card 250. Note the presence of platform management system 274 on the motherboard, to be described below in connection with the different interfaces that may be used to control execution by the BIST units.

Once the physical layer testing has been completed, and the test units make available their error codes, control of the system interconnect may be relinquished by the BIST units. The system may then transfer control of the interconnect to the core function circuitry in each of the primary components, so that conventional or normal start-up operations and core function testing, such as via booting an operating system program, can proceed. An example of such a BIST test sequence is shown in FIG. 3.

Operation may begin with the IBIST cells, such as those in the processors and chipset, testing the major interconnect buses and interfaces, at full bandwidth (block 304). Such testing may be executed following a request made through a power on self test (POST)/BIOS program or firmware (FW) executing in the computer system, prior to OS boot. The IBIST cells will then generate error codes upon encountering any failures. As mentioned below, these error codes may be accessible via execution of an onboard test program such as the BIOS and/or the FW.

Block 308 refers to testing conducted by an MBIST cell in a memory controller, transceiver, or memory IC of the memory subsystem. This test may either follow the completion of the IBIST testing referred to in block 304, or it may partially overlap to reduce test time. Again, the MBIST tests, just like IBIST, may be initiated through FW/BIOS execution at either board or platform level. Any error codes which are generated upon failure may be stored in the BIST unit of the memory subsystem hardware for subsequent retrieval.

Figure 3:
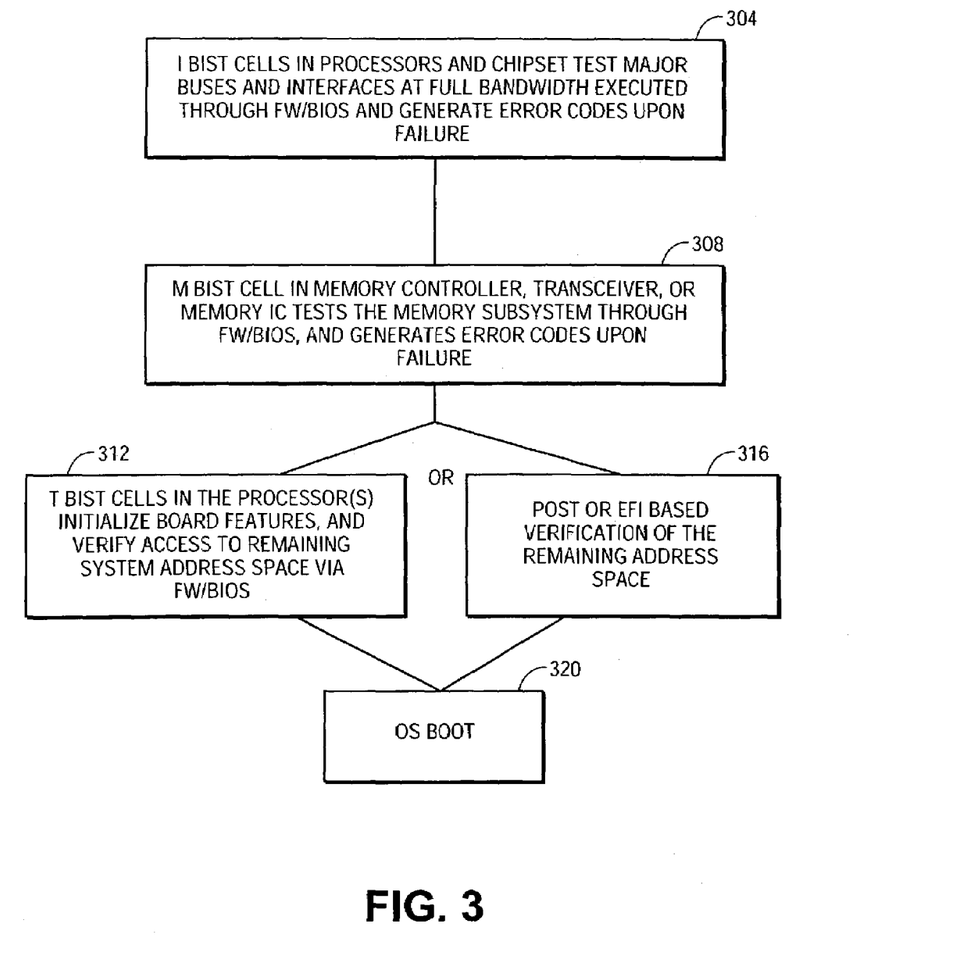
FIG. 3 depicts a flow diagram of operations for testing a computer system using BIST cells.

FIG. 3 also shows blocks 312 and 316 which refer to tests of the remaining address space in the system, using a transaction-based testing technique. Block 312 refers to the TBIST cells of the processors initializing board features such as memory controllers and/or I/O controllers, and then verifying access to the remaining system address space using normal bus transactions. In some cases, a conventional POST/BIOS/EFI program itself may have sufficient coverage of the remaining fault spectrum so that TBIST testing is not critical (block 316). It should be recognized that by the time block 312 or 316 is reached, most of the high speed faults should have been detected, with good fault isolation. The process then continues with the relatively coarse granularity test of block 316 (conventional, OS or FW-based testing), or the better granularity testing available through TBIST (block 312), both of which are transaction-based.

Finally, at block 320, control of the system may be transferred to an OS program (in the case a platform is being tested, rather than just a system board). As mentioned above, conventional OS-based testing of the interconnect, memory subsystem, and I/O subsystem, typically provided in an OS-based test routine, may no longer be necessary at the system board stage of manufacture given the comprehensive nature of the combination of the three BIST capabilities.

The test sequence of FIG. 3 may be performed in at least the following two modes. There may be a pre-boot (push-button) mode primarily useful for validation run-in, functional board, or system test, where software/firmware (e.g., BIOS or EFI) commands execution by the BIST units of the primary components in the system, and then collects the error codes. This mode may be executed at the end-user stage as well, each time the system is powered up or placed in a special test mode.

A second mode of operation presents a user-configurable diagnostic environment in which a comprehensive tool kit is provided, to allow custom test configuration, sequencing, and result analysis for purposes of debug or performance optimization. In that mode, it may be expected that a board/platform BIST controller is provided, for example, as an add-on test card that is plugged into an I/O card slot on the motherboard, or other external test system that connects with the board through a conventional interface such as JTAG. It should be noted in general then that all different test levels of the hierarchy, including chip-level (e.g., MBIST), board level (e.g., IBIST), and platform level (e.g. I/O subsystem testing using TBIST) may be controlled through a number of different types of interfaces, including boundary scan or JTAG, firmware executed by the platform management system 274 (see FIG. 2), and a BIOS executed by the primary processor.

Interfaces to BIST

According to an embodiment of the invention, the BIST cells are firmware/software accessible via a low speed bus of the board or platform, such as the System Management Bus (SMBus) or the inter IC (I2C) bus. A platform management subsystem 274 (see FIG. 2) of the computer system may be connected to each BIST unit by such a bus. The platform management subsystem may be a hardware/software combination that is built into the computer system for detecting and managing actual and potential failures of the system's hardware. The combination may be autonomous, or it may consist of software being executed by a primary processor of the computer system. The software may be part of a BIOS or an EFI, present on the manufactured board or platform. Access to the BIST cells may also, or in the alternative, be in accordance with a standard test access port (e.g. JTAG), useful for purposes of debug and validation. The JTAG instruction registers in that case could be modified with special bits that can be programmed in response to special instructions that may be provided by the component manufacturer to the system and platform developers.

In any case, user defined test controls may be provided on-chip, accessible through memory or I/O mapped registers of the computer system, to allow control of the BIST testing sequences, as well as store the results of the testing. This enables the execution of custom testing and debugging, including custom patterns. However, a default stimulus and capture setting may be integrated into each BIST, designed to address essentially all of the defect spectrum in the system. This default setting may be executed transparently, i.e. without user intervention, upon system reset or power-up.

Yet another alternative for initiating execution of testing by the BIST units is a form of self boot, originating within the respective IC component of each BIST unit. In that case, each BIST unit boots itself upon detecting that the IC component has been powered up and that its internal clocks are ready for normal operation. To take further advantage of this autonomous mode, any test stimuli used by the BIST unit should be integrated, so that neither the primary processor, a platform management system, or an external tester is needed to begin execution by the BIST units. The same sequence described above in connection with FIG. 3 may be followed in the sense that the IBIST cells will conduct the interconnect testing first, followed by (or partially overlapping with) memory testing by the MBIST cells, and then finishing with a TBIST execution or a transfer to a BIOS/EFI routine.

In addition to being used for board and platform manufacture/factory tests and end-user tests, the BIST units may be used to meet I/O and memory subsystem testing needs at the semiconductor design validation stage. For example, the MBIST cell may be used to test a memory core of a packaged memory IC, before installing the packaged memory IC on a module. BIST may be used for high volume silicon testing of AC/DC parametrics. This adds to the re-usability of the BIST units, thereby further enhancing their value.

Additional technical effects of one or more embodiments of the invention described above include the following. First, an entire system may be tested relatively quickly (certainly much faster than an OS-based test routine that sequentially applies complex text patterns to evaluate the components of the system), and before booting the OS program. For example, a conventional OS-based memory test may take minutes to verify the storage core and interfaces of a memory sub system. In contrast, similar test coverage may be obtained via MBIST, in a few seconds. This may be primarily due to the pin level, at speed testing that can be had using on-chip hardware. BIST can thus be said to be more concentrated in its testing coverage and have greater testing efficiency than an OS application. Also, since BIST is a pre-boot operation, OS boot time is saved due to much fewer OS level tests (if any) remaining to be performed. In addition, the ability to perform certain tests in parallel and at speed, i.e. at the normal clock speed of the core function circuitry, also helps reduce total test time. For instance, memory core testing by the MBIST cell may occur at the same time as the IBIST cells of the other components are verifying a component interconnect. In some cases, it is expected that the combination of MBIST, IBIST, and TBIST will be sufficient for high volume manufacture tests of the motherboard, thereby obviating the need for a much more time consuming OS-based test prior to shipping the motherboard to a platform assembly entity.

Figure 4:
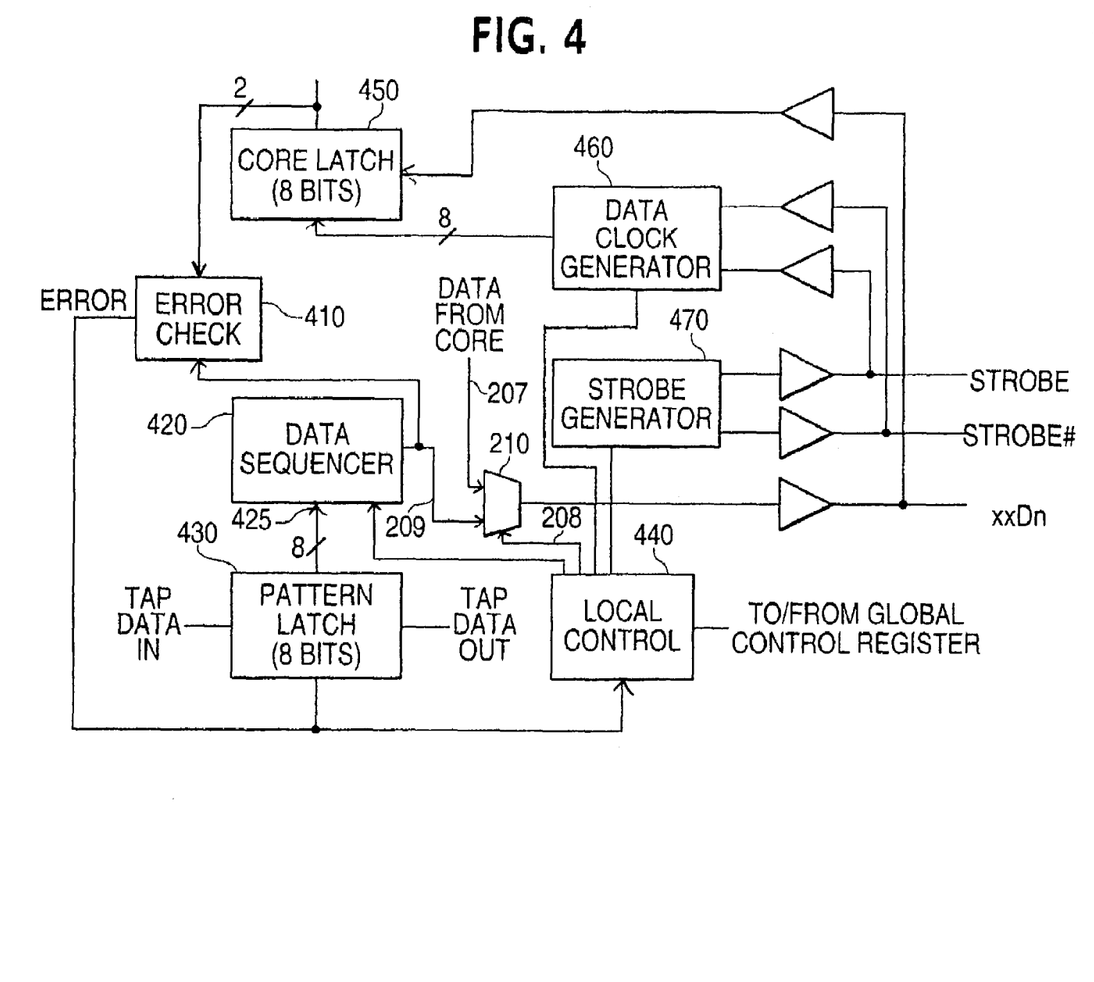
FIG. 4 is a circuit diagram of an IBIST architecture incorporated into a source synchronous bus architecture according to an example embodiment of the invention.

FIG. 4 is a circuit diagram of an IBIST architecture incorporated into a source synchronous bus architecture according to an embodiment of the invention.

Each component (such as processors, memory hubs, buffers, etc.) integrating the IBIST architecture may contain an N bit pattern latch 430, a bit (or data) sequencer 420, an error checking logic device 410 and local control 440. The data passes through the multiplexer 210 and is sent across the bus (shown as data line xxDn in FIG. 4). That is, data may be transmitted along data line xxDn to the bus (for transmission to another component). FIG. 4 only shows a single pad connection (or single bit) to the bus although the system may have other pad connections to the bus. These other pad connections are not shown for ease of illustration. In the FIG. 4 illustration, N corresponds to 8. Other values of N are also within the scope of the invention.

The circuit diagram also includes circuit elements that are common to a normal processor operating by use of a source synchronous bus. These elements include a core latch 450 to receive bits from the core (not shown), a data clock generator 460, a strobe generator 470 and buffers. The strobe generator 470 may be responsible for providing the strobe synchronous signals Strobe and Strobe#. These components operate in a normal manner by use of the strobe synchronous signals Strobe and Strobe#. Additionally, data may be received along data line xxDn and fed to the core latch 450 through one of the buffers.

The N bit pattern latch 430 may be a serial/parallel latch that is in a user defined, private scan chain. Each I/O buffer (such as those shown in FIG. 2) may be coupled to this chain in a serial fashion. The pattern latch 430 may be clocked by a Test Access Port (TAP) clock for serial scan in/out operation. The pattern latch 430 may also have a parallel load clock for loading data to be scanned out. The N bit pattern to be sent or received from the bus (or other type of interconnect) may be shifted into the pattern latch 430. Each parallel output from the pattern latch 430 may be output to the bit sequencer 420 along signal lines 425. Controls of the bit sequencer 420 may be coupled by signal lines (such as three lines) to a pattern state machine provided within the local control 440. These control signals may be decoded in the bit sequencer 420 to select one of N bits of pattern data to be sent out to the pad (of the bus) in a transmit mode or to be sent to the error logic in a receive mode. The error checking logic device 410 may be coupled to both the output of the pattern sequencer 420 and the core data latch 450.

Error checking may be done by the error checking device 410 (FIG. 4) during/subsequent to a pattern transfer. The error checking may be done on a bit by bit basis. Once the error checking device 410 has determined that an error has occurred in the transferred pattern, the pattern latch 430 may be latched for an entire pattern transfer and the error checking device 410 may report the error in real time. The error bit in each latch may be sent to the pattern latch 430 so that the error condition of each latch can be scanned out of the pattern latch 430 at the end of a pattern transfer to determine the I/O buffer having the error condition. This error condition may represent an error of the interconnect associated with that buffer. The error bits from each I/O buffer may also be coupled to the local control 440 for each bus group. An error signal may be sent to the local control 440 to record when a first error occurs in the pattern transfer in both the open mode and the fixed (or stress) mode. This pattern data may be scanned out of registers within the local control 440. The error signals from each local control 440 may be coupled to an error bit in a global control register that enables monitoring of this register to check error conditions after and/or during each test.

The local control 440 may contain a pattern sequencing state machine and various counters (or registers) that control pattern transfers on the bus. The state machine may operate in both a transmit mode and a receive mode. The state machine may send the sequence control data bits to each buffer to be decoded by the pattern sequencers (such as the pattern sequencer 420). The counters within the local control 440 may determine how many times an N bit pattern is transferred. This may be used to control operation of the state machine. The counters may also be used in a fixed (or stress) mode to control the pattern sequence generation. The local control 440 may also include a clock frequency controller to set the pattern frequency on the bus. Clocking for the pattern state machine may come from one of two sources depending on the mode of operation. In a transmit mode, the data transmit clock used by each bus cluster may be used. On the other hand, in a receive mode, the state machine may be clocked from a clock generated by the logic used in the bus synchronization and depends on the type of bus being used. For example, the strobe from a source synchronous bus may be used along with a qualified bus clock on a common clock bus. In a common clock bus, the bus clock may be qualified by another signal to indicate the start and end of a pattern transfer since the bus clock is continuously running as opposed to a source synchronous bus where the strobes only toggle during data transfer.

The global control circuitry (not shown) may include a control register for the entire pattern generator. The control register may be included in the pattern generator scan chain. The register may contain a global start/stop bit, a global error bit, and a global parallel load bit.

Figure 5:
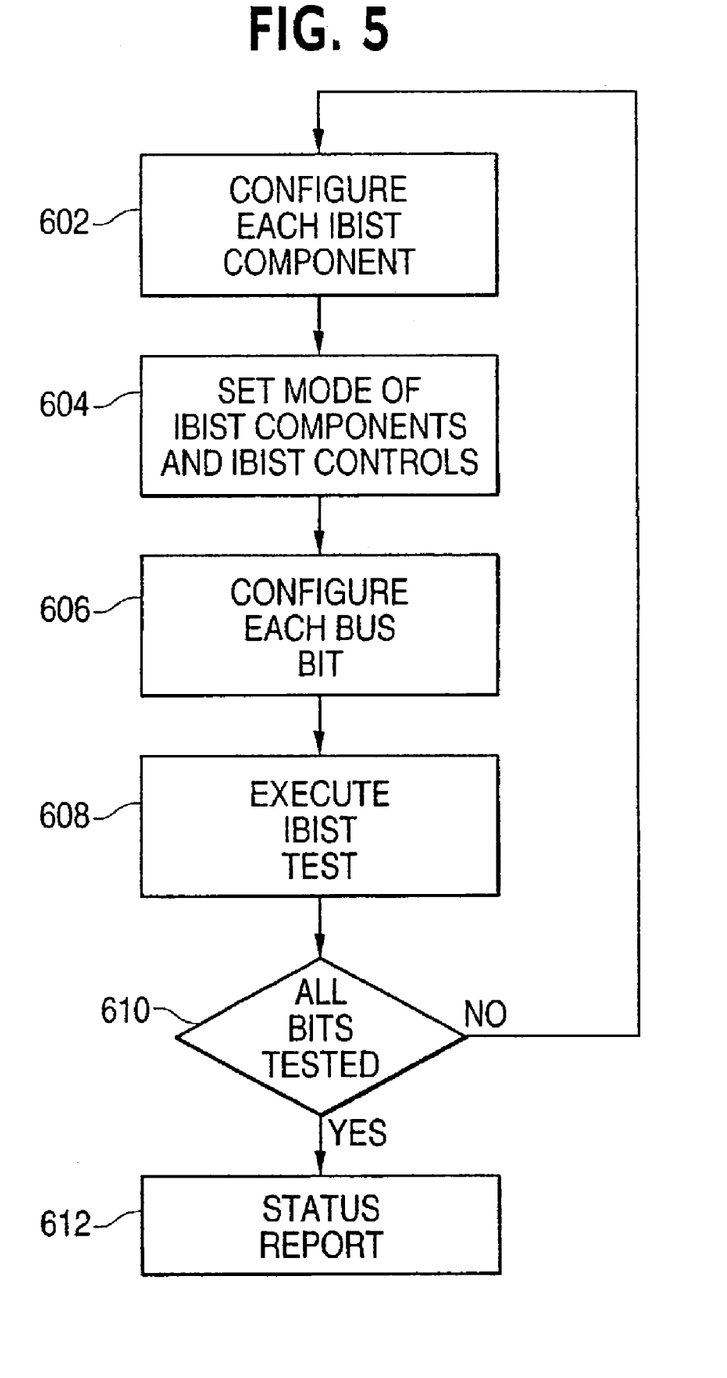
FIG. 5 is a flow chart showing IBIST operations according to an example embodiment of the present invention.

FIG. 5 is a flow chart showing IBIST operations according to an embodiment of the invention. Other embodiments, operations and orders of operations are also within the scope of the present invention.

More specifically, in block 602, each IBIST component may be configured as a transmitting agent or a receiving agent. That is, each bus associated with a component having the IBIST technology may be configured as either a transmitting agent or a receiving agent by the loading of an IBIST configuration register prior to test execution.

In block 604, the mode of the IBIST components and various IBIST controls are set. For example, both the components configured as transmitting agents and receiving agents are loaded with a designated pattern (setting IBIST mode and control features) prior to execution. An identical pattern may be loaded into both the transmitting agent and the receiving agent.

In block 606, each bus bit may be configured as a transmitting agent or a receiving agent. For each bus segment to be tested, each I/O component may be configured as a transmitting agent or a receiving agent prior to test execution. While the above operations have been described as separate operations, one skilled in the art would understand that each of blocks 602–606 may be performed together with one pattern.

In block 608, the IBIST test may be executed. For example, testing may begin once all the board/platform's IBIST capable components have been configured and loaded with the designated test patterns. The transmitting agent on the bus may initiate the bus cycles to send the pattern to the receiving agent. The transmitting agent does not perform error checking on the pattern. The receiving agent does not transmit any pattern information onto the bus but rather uses the initially loaded pattern to compare with the transmitted pattern data for error checking. Synchronization on the bus between components using the IBIST pattern generator may be accomplished in the same manner the bus is used in normal operation.

In block 610, a determination is made whether all bits of a pattern have been tested. That is, the testing methodology may focus on testing a single bit on a bus at a time (i.e., the receiving agent). Thus, the test algorithm may reconfigure the bus receiving agents at the end of each test pass to facilitate testing a complete bus. If the determination is negative in block 610 then the operations may return to block 602. On the other hand, if the determination is positive in block 610, then a status report of the testing (and thus the interconnect) may be issued in block 612.

Yet another beneficial aspect of the IBIST cell may be its ability to determine the most robust configuration for programmable, I/O buffer (driver and receiver) circuitry. The IBIST cell will thus feature digital control (e.g. via a few bits in a register) of, for example, reference levels, driver strength, and signal termination. This also allows the IBIST cell to sweep these driver and/or receiver circuitry parameters and thereby select the most robust reference voltage levels for normal operation of the I/O buffer of its IC component. This in-package hardware capability of the IBIST cell substantiates the performance level of the I/O buffers at the system or platform level. Thus, for example, the IBIST cell may indicate that the strobe signals on a particular I/O interface are being driven by circuitry which can tolerate, at best, a 10% variation in timing (advance or delay) or reference voltage levels.

To summarize, various embodiments of a reusable, built-in self test methodology for computer systems have been described. In the foregoing specification, the invention has been described with reference to specific exemplary embodiments thereof. It will, however, be evident that various modifications and changes may be made thereto without departing from the broader spirit and scope of the invention as set forth in the appended claims. For example, the reference to a "computer system" is not intended to be limited to general purpose (e.g. personal) computers but rather encompasses any digital system board or platform that could benefit from the above described test methodology. The specification and drawings are, accordingly, to be regarded in an illustrative rather than a restrictive sense.

What is claimed is:

1. A method comprising:
   testing a computer system using electrical stimuli that are under control of a plurality of test units located in a processor package, a chipset package, and memory subsystem hardware that make up the computer system and that are separate from processor, chipset and memory core function circuitry, the test units that are in the processor and chipset packages to conduct at-speed interconnect testing of the computer system, without requiring a processor core of the processor package to execute an operating system program for the computer system, to determine whether specified requirements of a component interconnect bus of the system are satisfied; and wherein one of the test units that is located on-chip with the processor core further issues bus transactions, that are in accordance with a bus protocol used by the processor core, to determine whether an I/O subsystem of the computer system meets a specification, without requiring the processor core to execute the operating system program.

2. The method of claim 5 further comprising:
conducting integrated circuit design validation, under the direction of the test unit of said one of the processor package, chipset package, and memory subsystem hardware in which the test unit is located.

3. An article of manufacture comprising:
a machine-readable medium having data that, when accessed by a platform management subsystem of a computer system, cause a plurality of programmable built-in test units, each associated with respective core function circuitry and located in a separate, primary integrated circuit component of the computer system, to be configured for testing, at speed and without requiring an operating system program to boot, a primary component interconnect, a memory subsystem, and an I/O subsystem of the computer system to determine whether electrical specifications of the computer system are met.

4. The article of manufacture of claim 3 wherein the medium has further data that, when accessed by the platform management subsystem, cause a test pattern to be loaded into one of the plurality of test units, said test pattern being designed to stress one of the primary component interconnect, memory subsystem, and I/O subsystem.

5. The article of manufacture of claim 4 wherein the medium has further data that, when accessed by the platform management subsystem, cause error information to be read from a register of one of the plurality of test units.

6. The article of manufacture of claim 4 wherein the medium has further data that, when accessed by the platform management subsystem, cause the platform management subsystem to signal one of the plurality of test units to begin testing.

7. A method comprising:
testing a computer system using electrical stimuli that are under control of a plurality of test units located in a processor package, a chipset package, and memory subsystem hardware that make up the computer system and that are separate from processor, chipset and memory core function circuitry, the test units that are in the processor and chipset packages to conduct at-speed interconnect testing of the computer system, without requiring a processor core of the processor package to execute an operating system program for the computer system; and wherein one of the test units issues bus transactions as part of a test that determines whether an I/O card of the system meets a specification, without requiring any program to be executed by the processor core to configure the test unit and start said test.

8. The method of claim 7 further comprising:
conducting integrated circuit design validation, under the direction of the test unit of said one of the processor package, chipset package, and memory subsystem hardware.

9. A computer system comprising:
a printed wiring board having a component interconnect;
a plurality of integrated circuit (IC) components including a processor and memory each having its respective core function circuitry, built-in test unit, and I/O buffer circuitry, the plurality of IC components being installed on the board with the respective I/O buffer circuitry being coupled to the component interconnect, the built-in test units to conduct test stimulus and capture through the I/O buffer circuitry and the component interconnect, at normal operation bus clock frequency, to cover a fault spectrum of the computer system; and wherein each test unit includes an interconnect test cell to conduct test stimulus and capture that is isolated from link and transaction layers of a bus protocol for the interconnect, so that the interconnect is stressed, and wherein the test unit of the processor further includes a transaction test cell to conduct test stimulus and capture in accordance with said transaction layer of the bus protocol, and wherein the plurality of IC components further include a chipset, a transaction test cell of the chipset is to conduct test stimulus and capture at the transaction layer for testing an I/O subsystem of the computer system.

10. The system of claim 9 wherein the memory has a memory core, the built-in test unit of the memory is to further conduct a test stimulus and capture of the memory core.

11. The system of claim 9 wherein the fault spectrum of the computer system includes fault spectrums of the component interconnect, the memory, and an I/O subsystem of the computer system.

12. The system of claim 9 wherein the transaction test cell of the processor is to conduct at speed bus transactions through the I/O buffer circuitry to test an I/O subsystem of the computer system.

13. The system of claim 9 further comprising:
a platform management subsystem installed on the board and coupled to the built-in test units via a separate bus than the component interconnect, the subsystem to execute firmware for configuring the test units with a test pattern.

14. The system of claim 13 wherein the firmware is to be executed prior to booting an operating system program of the computer system.

* * * * *

UNITED STATES PATENT AND TRADEMARK OFFICE
CERTIFICATE OF CORRECTION

| | |
|---|---|
| PATENT NO. | : 7,155,370 B2 |
| APPLICATION NO. | : 10/393223 |
| DATED | : December 26, 2006 |
| INVENTOR(S) | : Nejedlo |

It is certified that error appears in the above-identified patent and that said Letters Patent is hereby corrected as shown below:

In column 11, at line 11, delete "5" and insert --1--.
In column 11, at line 29, delete "artide" and insert --article--.
In column 11, at line 39, delete "artide" and insert --article--.

Signed and Sealed this

Sixth Day of November, 2007

JON W. DUDAS
*Director of the United States Patent and Trademark Office*